Nov. 22, 1955

A. S. McKAY 2,724,779

COUNTERS FOR DISCRIMINATING BETWEEN
GAMMA RAYS OF DIFFERENT ENERGIES

Filed Dec. 12, 1950

INVENTOR.
ALEXANDER S. McKAY
BY
ATTORNEYS

United States Patent Office 2,724,779
Patented Nov. 22, 1955

2,724,779

COUNTERS FOR DISCRIMINATING BETWEEN GAMMA RAYS OF DIFFERENT ENERGIES

Alexander S. McKay, Houston, Tex., assignor to The Texas Company, New York, N. Y., a corporation of Delaware Application December 12, 1950, Serial No. 200,445

7 Claims. (Cl. 250—83.6)

This invention relates to gamma ray detectors of the counter or electrical pulse-producing type and, more particularly, to a method and a device which are capable of discriminating between gamma rays of high and low energies. The principal object of the invention is the provision of a gamma ray counter, only slightly different in construction from those now in use, and which will function normally when gamma rays of high energy are intercepted, but which will suppress gamma rays of low energy so that they will not be registered.

The invention is particularly useful in connection with a gamma ray counter of the multi-cathode plate type, such as is disclosed in the U. S. Letters Patent No. 2,397,071, granted March 19, 1946 to D. G. C. Hare. In that patent a counter is described in which the cathode is formed of a plurality of parallel, separated, thin metallic plates provided with one or more series of aligned holes and with an anode wire extending along the axis of each series of holes. The cathode and anode, of course, are disposed within a housing or envelope containing a suitable gaseous filling.

Gamma rays are detected in the conventional Geiger-Mueller counter or in the multiple plate counters, when they interact with the cathode matter in the counter in such a way as to produce electrons which are energetic enough to emerge from the cathode plates or walls to ionize the gas in the counter. In general, the more energetic the gamma rays, the more energetic are the photo- and Compton electrons which are produced. Calculations show that the efficiency of the multiple plate counters for detecting gamma rays increases until the plate thickness is equal to the range of the photo- and Compton electrons and then remains nearly constant as the thickness is increased still further. This means that if one is interested in detecting fairly low energy gamma rays of about 0.5 m. e. v. or less, the counter plates should be no thicker than the maximum range of the resulting recoil electrons. Any further increase in the plate thickness simply increases the efficiency for detecting any higher energy gammas that may be present. Since the low energy gamma rays produce mainly photoelectrons, counters made with plates of a high atomic number have a greater efficiency for detecting the low energy gamma rays than where a low atomic number metal is used.

One of the methods of radioactivity well logging is known as the scattered gamma or the gamma-gamma method. In this method a source of gamma rays is passed through the well or bore hole and gamma rays from the source bombard the formations surrounding the hole, from which formations some of the gamma rays are scattered back to the hole where they are intercepted by a gamma ray counter. These scattered gamma rays are of comparatively low energy, seldom higher than an 0.5 m. e. v. From the foregoing discussion, it will be seen that the ideal cathode plates for scattered gamma ray logging should be made of a high atomic number metal such as tantalum, about 4 mils in thickness.

In another form of radioactivity logging, generally known as the neutron-gamma or induced gamma ray method, neutrons from a source passed through the well bombard the formations, and depending upon the nature of these formations, cause gamma rays to be induced therein, some of which pass back into the well where they intercept a gamma ray detector. These induced gamma rays generally have energies from 2.2 m. e. v., upwards, for example, a 2.2 m. e. v. gamma ray being given off when a neutron is captured by hydrogen. In the neutron-gamma ray well logging method, scattered gamma rays are also encountered, since gamma rays are given off from the neutron source which usually consists of a mixture of radium and beryllium, and these scattered gamma rays would normally strike the detector which is present for measuring the induced gamma rays. Since the intensity of these scatterd gamma rays does not provide the same information obtained by measuring the intensity of the induced gamma rays, it is very desirable to suppress them, or in some manner to prevent them from being registered by the gamma ray detector. Of course, if a neutron source such as a mixture of polonium and beryllium is used, very few gamma rays are given off, but these sources are much more expensive than the radium-beryllium sources.

When one makes the cathode plates of the induced gamma ray counters out of a low atomic number metal such as aluminum instead of a high atomic number metal such as tantalum, the efficiency for detecting the low energy gamma rays is descreased a great deal, while the efficiency for detecting the higher energy gamma rays remains comparatively unchanged, provided that the aluminum plates are of sufficient thickness. The maximum range of 2 m. e. v. electron in aluminum is about 1 gm./cm.$^2$ or 145 mils. (See "Nucleonics," vol. II, p. 12, 1948—L. E. Glendenin.) Therefore, it will be seen that for a reasonable approach to maximum effiency, the cathode plates when made of aluminum should be at least 100 mils in thickness, but when plates of this thickness are used, the number of plates which can be placed in a counter of a given length is materially decreased, with a corresponding decrease of overall efficiency.

In accordance with the present invention, the ideal neutron-gamma counter cathode plate or wall is approached by forming the plate or wall of a layer of a high atomic number metal such as tantalum, lead, bismuth or the like, sandwiched between two layers of a light metal such as aluminum. In this manner the plate thickness is reduced without increasing the efficiency of the counter for detecting the low energy gamma rays, since the photoelectrons produced by these low energy gamma rays in the tantalum or other high atomic number metal will be unable to penetrate the aluminum layers so as to get out into the gas to ionize the latter. As an example, the maximum range of an 0.5 m. e. v. electron in aluminum is only 0.014 inch.

The use of the compound or laminated cathode plate is still more effective for discriminating between low energy gamma rays and those which have an appreciable cross section for pair production, say equal to or greater than 5 m. e. v. in lead or tantalum. Tantalum has a much larger cross section for electron pair production than aluminum when bombarded by these energetic gammas. One m. e. v. of the energy of the gamma is required for the rest mass of the electron pair and most of the remaining energy appears as the kinetic energy of the positive and negative electrons. The resulting energetic electrons have great penetrating power and can easily penetrate the outside aluminum layers which only need to be thick enough to stop the photoelectrons that are produced in the tantalum by the low energy gammas in order to suppress the detection of these low energy gammas. The optimum thickness of the tantalum section would once more be determined by the maximum ranges of the electron pairs or at still higher energies by the "range" of the electron photon cascade and hence by the energy of the high energy gammas that are being preferentially detected.

For a better understanding of the invention, reference may be had to the accompanying drawing in which.

Figure 1:
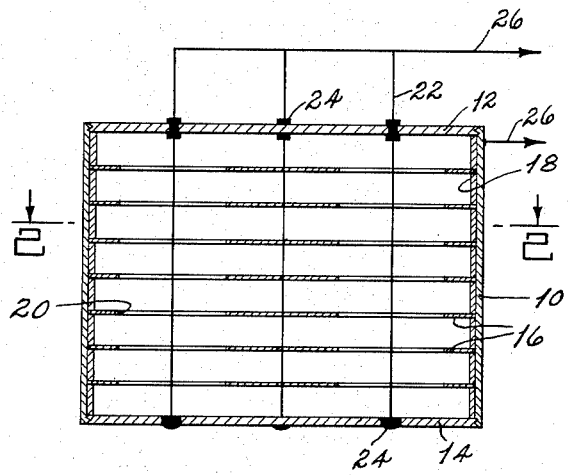
Figure 1 is a somewhat diagrammatic sectional elevation through a gamma ray counter containing seven parallel cathode plates, and four anode wires.
Figure 2:
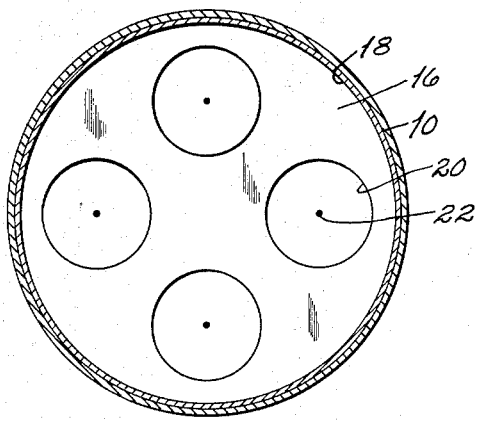
Figure 2 is a sectional plan view taken on the line 2—2 of Figure 1.

Referring to the drawing, Figures 1 and 2 show a multiple cathode plate gamma ray counter generally of the type disclosed in the aforementioned Hare Patent No. 2,397,071. A cylindrical housing or shield 10 is provided with top and bottom cover plates 12 and 14 adapted to be screwed into the ends of the cylinder to provide an hermetically sealed enclosure. Within the housing is a plurality of cathode disks or plates 16 spaced uniformly in parallel relation and separated by means of annular spacing rings, 18. Each of the plates 16 is provided with one or more holes 20, four being shown in this instance and the plates are arranged so that the holes will be aligned in several series. An anode wire 22 is stretched along the axis of each series of holes and is maintained in its stretched position in any suitable manner such as by being fastened to electrically insulating plugs 24. The counter is filled with a gas or gaseous mixture under a pressure of atmosphere or slightly less, and while any suitable gas may be used, it is preferred to use a mixture comprising about 2% ammonia and about 98% argon, neon or krypton as is disclosed in the U. S. Letters Patent No. 2,512,773, granted June 27, 1950, to Gerhard Herzog and A. D. Garrison. The plates 16 are connected together electrically to form a unitary cathode and the anode wires are also connected together electrically. As well known to those familiar with gamma ray detection, when a gamma ray strikes one or more of the cathode plates 16, an electron or electrons may be ejected and these electrodes entering the gas cause ionization thereof to produce an electrical pulse across the leads 26. The leads, of course, are connected to a source of high potential, not shown, almost but not quite high enough to produce a discharge between the anode wires and the edges of the holes in the cathode plates. An electrical resistor also not shown is usually connected between the source of high potential and the leads 26 and the voltage drop across this resistor produced by the pulse or discharge is recorded in any suitable manner.

Figure 3:
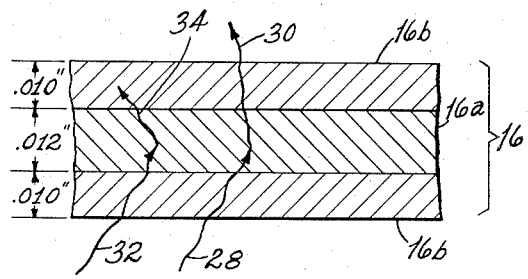
Figure 3 is a somewhat diagrammatic view in cross section through a small but greatly enlarged portion of one of the compound cathode plates.

As is shown in Figure 3, each of the cathode plates 16 is formed in the nature of a sandwich containing a center layer 16a of a high atomic number metal such as tantalum, lead, bismuth, tungsten and the like and two outside layers 16b of a low atomic number such as aluminum, magnesium, titanium or the like. By way of example, the center layer is indicated as having a thickness of .012 inch and the outer layers a thickness of .010 inch, but it is to be understood that these thicknesses will be selected in accordance with the energies of those gamma rays which are to be measured and of the gamma rays which are not wanted and are to be suppressed. The thicknesses shown in the drawing should provide the maximum efficiency for detecting gamma rays in the 1.5 to 2.5 m. e. v. range while the aluminum layers should suppress the detection of all gamma rays less than about 0.5 m. e. v.

In Figure 3 a high energy gamma ray 28 is shown as passing through the lower layer 16b into the center layer 16a wherein it strikes an atom of the metal to produce an electron 30. Since the gamma ray 28 has a high energy, the electron 30 which is ejected will have sufficient energy to pass completely through the upper or lower layer into the surrounding gas which is thereby ionized to produce a pulse in the manner which has been described. By way of illustration, the gamma ray 28 can be considered as an induced gamma ray produced by a neutron in a formation surrounding a well bore and it is the intensity of these gamma rays which it is desired to measure. Let us also assume that a weak gamma ray 32 passes into the layer 16a, this gamma ray being one which originated in a neutron source and which has entered the surrounding formation and been scattered back to intercept the detector in the bore hole. An electron 34 is shown as having been ejected from the material of the center layer 16a due to the impingement of the gamma ray 32 on an atom of that material. Since the gamma ray 32 is of low energy, the electron 34 will also be of low energy so that the electron will die out in one of the layers 16b of a low atomic number metal. The electron 34 will therefore not pass out into the surrounding gas to cause ionization thereof and it will have no effect on the record which will therefore show the intensity of the high energy gamma rays 28.

Although the invention has been described as applied to a multiple cathode plate counter, it is to be understood that a similar effect will be obtained where the cathode is formed of a single cylinder such as in the conventional Geiger-Mueller counter.

Obviously many modifications and variations of the invention, as hereinbefore set forth, may be made without departing from the spirit and scope thereof, but only such limitations should be imposed as are indicated in the appended claims.

I claim:

1. A method of measuring the intensity of high energy gamma rays while discriminating against gamma rays of low energy which comprises causing gamma rays of both energies to strike a high atomic number metal used as the cathode of a gamma ray detector of the electrical pulse-producing type so that electrons will be ejected from said metal to produce ionization of the surrounding gas, and absorbing the weak electrons ejected within said metal by the low energy gamma rays so that they will not reach and produce ionization of the surrounding gas by interposing between said high atomic number metal and said gas a layer of low atomic number metal, said layer of said low atomic number metal being readily penetrable by the stronger electrons produced in the high atomic number metal by the action of the gamma rays of high energy.

2. A method of measuring the intensity of gamma rays having energies higher than 1.5 m. e. v. while discriminating against gamma rays having energies of 0.5 m. e. v. or less which comprises causing gamma rays of both energy ranges to strike a non-radioactive metal having an atomic number between 73 and 83 used as the cathode of a gamma ray detector of the electrical pulse-producing type so that electrons will be ejected from said metal to produce ionization of the surrounding gas, and absorbing the weak electrons ejected within said metal by the said low energy gamma rays by interposing between said high atomic number metal and said gas a layer of a non-radioactive metal having an atomic number between 12 and 22 so that the said weak electrons will not reach and produce ionization of the surrounding gas.

3. The method as described in claim 2 in which the high atomic number metal is tantalum.

4. The method as described in claim 2 in which the low atomic number metal is aluminum.

5. The method as described in claim 2 in which the high atomic number metal and the layer of low atomic number metal each has a thickness of from 5 to 20 mils.

6. The method as described in claim 2 in which the high atomic number metal has a thickness of about 12 mils and the layer of low atomic number metal has a thickness of about 10 mils.

7. The method as described in claim 6 in which the high atomic number metal is tantalum and the low atomic number metal is aluminum.

References Cited in the file of this patent

UNITED STATES PATENTS

| | | |
|---|---|---|
| 2,397,071 | Hare | Mar. 19, 1946 |
| 2,457,781 | Metten et al. | Dec. 28, 1948 |
| 2,508,772 | Pontecorvo | May 23, 1950 |
| 2,552,723 | Koury | May 15, 1951 |

OTHER REFERENCES

Increased Gamma-Ray Sensitivity etc., Evans et al., Rev. of Sci. Instruments, Dec. 1936, vol 7, pages 441–449.

On the Efficiency of Gamma-Ray Counters, Norling, Physical Review, vol. 58, page 277, 1940.